United States Patent [19]
Price et al.

[11] Patent Number: 5,945,139
[45] Date of Patent: Aug. 31, 1999

[54] INJECTION MOLD LIVE RUNNER APPARATUS

[75] Inventors: Garry R. Price; John G. Reifers; Mark L. Rodgers, all of El Paso, Tex.

[73] Assignee: Siemens Energy & Automation, Inc., Alpharetta, Calif.

[21] Appl. No.: 08/884,247

[22] Filed: Jun. 30, 1997

[51] Int. Cl.[6] .................................................. B29C 45/73
[52] U.S. Cl. ........................... 425/543; 425/572; 425/577
[58] Field of Search .................................... 425/543, 572, 425/577

[56] References Cited

U.S. PATENT DOCUMENTS

| | | | |
|---|---|---|---|
| 3,606,640 | 9/1971 | Schwartz | 425/556 |
| 3,797,984 | 3/1974 | Yago et al. | 425/243 |
| 3,959,433 | 5/1976 | Sauers | 264/328 |
| 4,004,871 | 1/1977 | Hardy | 425/243 |
| 4,309,163 | 1/1982 | Cottancin | 425/543 |
| 4,451,224 | 5/1984 | Harding | 425/572 |
| 4,734,027 | 3/1988 | Adams | 425/556 |
| 4,909,724 | 3/1990 | Sonoda et al. | 425/544 |
| 4,981,634 | 1/1991 | Maus et al. | 264/102 |
| 5,037,598 | 8/1991 | Akselrud | 264/328 |
| 5,219,512 | 6/1993 | Tsutsumi | 264/328 |
| 5,220,154 | 6/1993 | Gunther | 219/421 |
| 5,260,012 | 11/1993 | Arnott | 264/69 |
| 5,312,241 | 5/1994 | Gunther | 425/549 |
| 5,340,528 | 8/1994 | Machida et al. | 264/328 |
| 5,507,637 | 4/1996 | Schad et al. | 425/549 |
| 5,551,858 | 9/1996 | Yoshizawa et al. | 425/217 |

*Primary Examiner*—Tim Heitbrink

[57] ABSTRACT

Apparatus, means and method for injection molding of parts from thermoset molding material, especially, but not necessarily limited to, bulk molding compound. The apparatus, means and method employing a live mold runner for reducing the amount of scrap material resulting from the injection molding of parts.

11 Claims, 6 Drawing Sheets

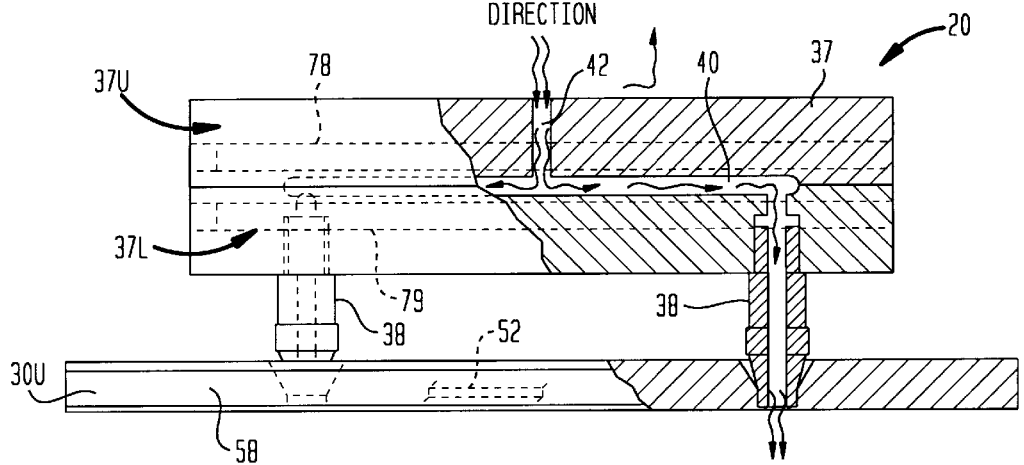
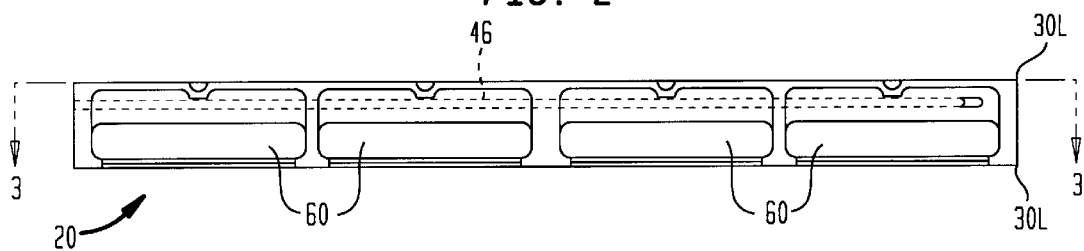
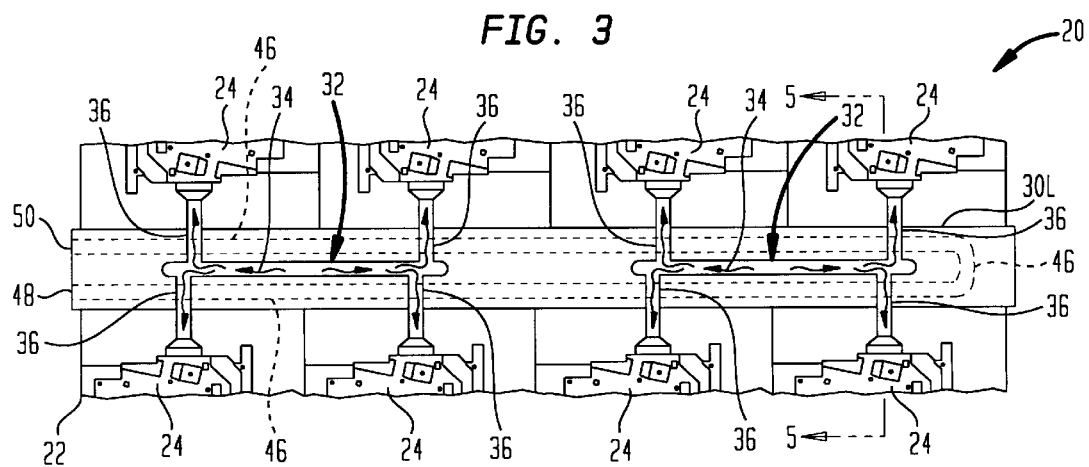

5,945,139

INJECTION MOLD LIVE RUNNER APPARATUS

FIELD OF THE INVENTION

This invention relates generally to an apparatus, means and method for injection molding of parts from thermoset molding material, especially, but not necessarily limited to, bulk molding compound. More specifically, it relates to an apparatus, means and method employing a live mold runner for reducing the amount of scrap material resulting from the injection molding of parts.

BACKGROUND OF THE INVENTION

A known apparatus, means and method for injection molding of parts from bulk molding compound (sometimes referred to in the trade as BMC) comprises a mold having multiple cavities into each of which live, meaning uncured, bulk molding compound is simultaneously injected from a runner and then allowed to cure to form a respective part having a shape corresponding to that of the respective cavity. The mold comprises one or more runners through which live molding compound flows into the cavities at the beginning of a molding cycle. The live molding compound may be introduced into the mold runner(s) through one or more nozzles of a manifold containing live molding compound. Once the cavities have been filled, the injection of molding compound is terminated, and the live molding compound that has been introduced into the mold cavities is allowed to cure. Upon completion of curing, the mold is opened to expose the cured material for removal. Before the mold is opened, the cured material comprises parts that have been formed in the mold cavities integrally connected by material that has also simultaneously cured in the runner(s). The individual parts that have cured in the cavities must be severed from the material that has cured in the mold runner (s). The latter material constitutes scrap material that is not reusable due to the thermosetting property of bulk molding compound. The scrap material may then be disposed of, such as by burial in a landfill.

SUMMARY OF THE INVENTION

The present invention relates to an apparatus, means and method for injection molding of parts from thermoset material, such as, but not necessarily limited to, bulk molding compound, that is believed to reduce significantly the amount of runner scrap material. Accordingly, the inventive principles yield both a savings in material cost because there is less scrap waste and also a savings in waste disposal cost because less scrap material needs to be disposed of.

In general, the inventive principles are embodied by employing a live runner, or runners, to introduce molding compound into the mold cavities. By maintaining molding compound material live in one or more runners, that live material can be injected into the cavities during the immediately succeeding molding cycle instead of curing into wasteful scrap. The inventive principles will be herein disclosed in an exemplary embodiment of a live runner associated with a representative multiple-cavity mold. It is to be appreciated however that generic principles of the invention are applicable to embodiments other than the exemplary one that is to be described.

One general aspect of the invention relates to injection molding apparatus comprising: a mold comprising relatively movable mold members defining multiple cavities in which parts are molded; the mold further comprising a runner which is proximately adjacent the mold members and through which live thermoset material is introduced into the cavities; the runner and the mold having a cooperative association such that while thermoset material that has been introduced into a respective cavity cures into a respective part and the respective cured part is removed from the respective cavity, thermoset material that remains in the runner is kept live for introduction into the cavities during a following molding cycle; the runner comprising plural runner members fastened together in assembly to cooperatively define a runner passage through which live thermoset material is conveyed to the cavities, the runner passage comprising an upstream portion in one of the runner members and a downstream portion defined at least in part by another of the runner members, the runner passage having an entrance opening at a surface of the one runner member adapted to be engaged by an injection nozzle for introducing live thermoset material into the runner passage.

Another general aspect relates to injection molding apparatus comprising: mold means comprising relatively movable mold members defining multiple mold cavities in which parts are molded; the mold means further comprising runner means which is proximately adjacent the mold members for running live thermoset material into the cavities; the runner means and the mold means having a cooperative association such that while thermoset material that has been introduced into a respective cavity cures into a respective part and the respective cured part is removed from the respective cavity, thermoset material that remains in the runner means is kept live for introduction into the cavities during a following molding cycle; the runner means comprising plural runner members fastened together in assembly to cooperatively define runner passage means through which live thermoset material is conveyed to the cavities, the runner passage means comprising an upstream portion in one of the runner members and a downstream portion in another of the runner members, the runner passage means having entrance opening means at a surface means of the one runner member adapted to be engaged by an injection nozzle means for introducing live thermoset material into the runner passage means.

The foregoing, along with further features, advantages, and benefits of the invention, will be seen in the ensuing description and claims, which are accompanied by drawings. The description and drawings disclose what is believed to be the practical and presently preferred embodiment of the invention.

BRIEF DESCRIPTION OF THE DRAWINGS

FIG. 1 is a front elevation view, partly in cross section, of a portion of an exemplary injection molding apparatus embodying principles of the invention.

FIG. 2 is a front elevation view of another portion of the exemplary mold apparatus embodying principles of the invention.

FIG. 3 is a plan view in the direction of arrows 3—3 in FIG. 2 that further includes portions of mold cavities.

DESCRIPTION OF THE PREFERRED EMBODIMENT

Figure 4:
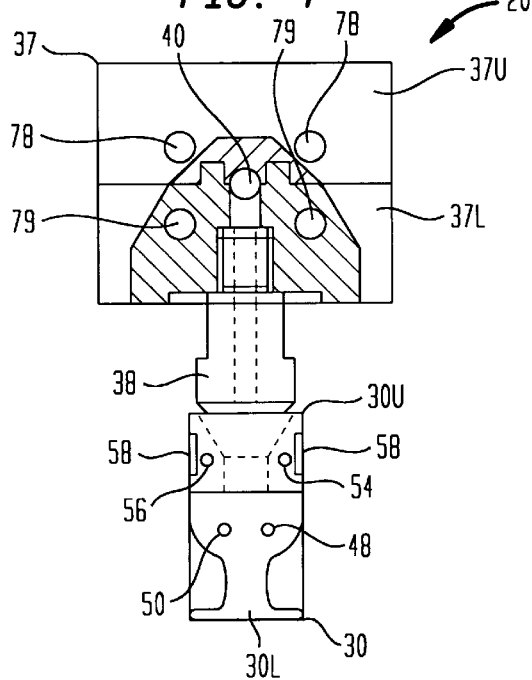
FIG. 4 is a left side elevation view showing the exemplary mold apparatus portions of FIGS. 1 and 2 in cooperative association.
Figure 5:
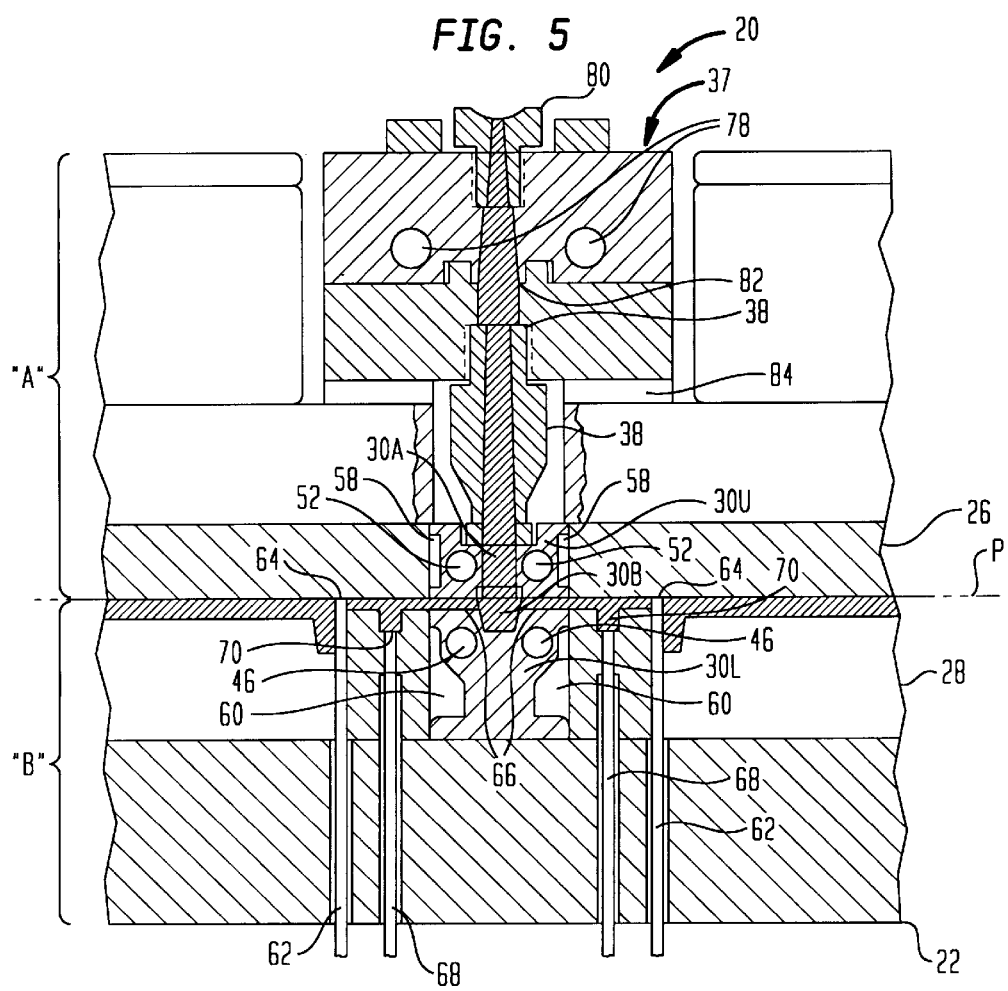
FIG. 5 is an enlarged transverse cross section view in the general direction of arrows 5—5 in FIG. 3, but with the mold portions of FIGS. 1 and 2 in cooperative association during a molding cycle.
Figure 6:
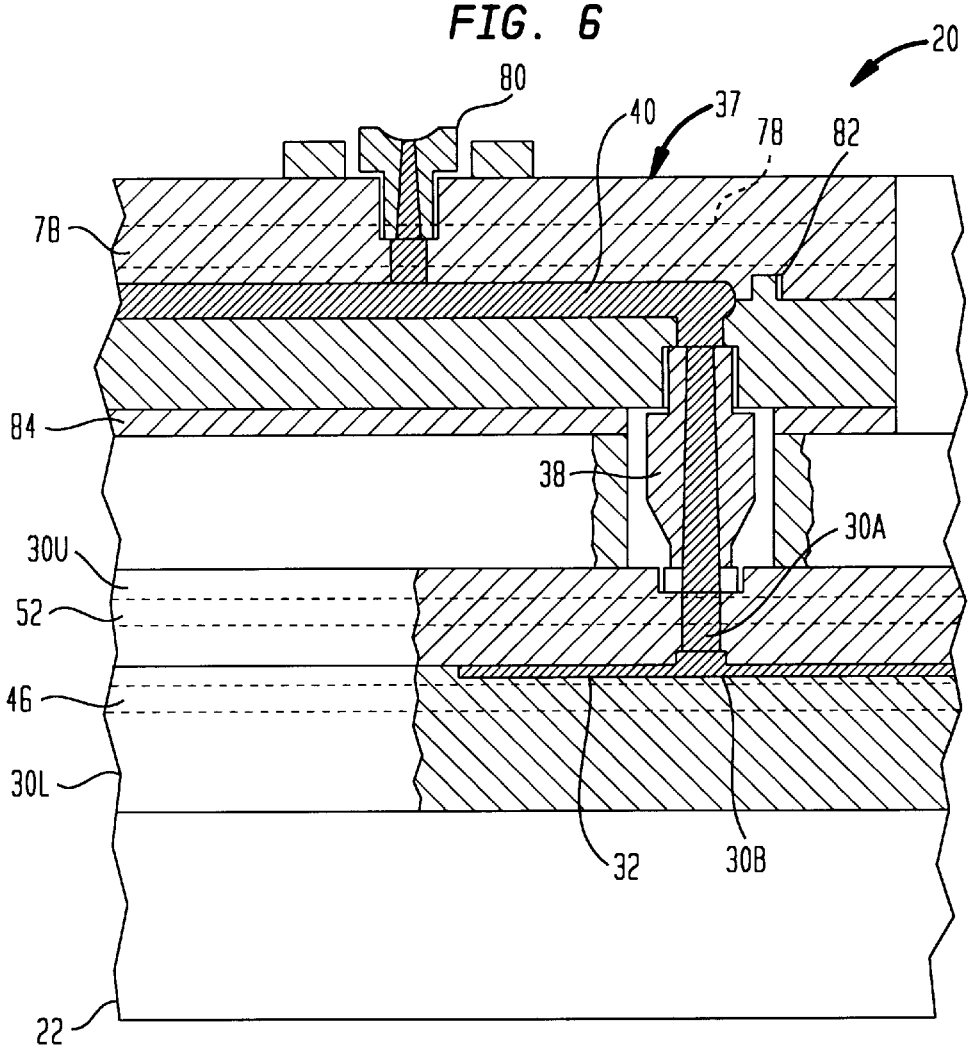
FIG. 6 is a fragmentary view at 90° to the view of FIG. 5.

FIGS. 1–6 illustrate injection molding apparatus 20 embodying principles of the invention and comprising a mold 22 having multiple individual cavities 24 cooperatively defined by two mold members 26, 28, which are shown in closed position in FIGS. 5 and 6, where they come together at a parting plane P. The letter "B" in FIG. 5 is intended to generally designate the movable portion of the mold, sometimes referred to in the trade as the "B side", and the letter "A", the non-moving "A side".

Molding apparatus 20 further comprises a runner 30 having a upper runner member 30U and a lower runner member 30L that are suitably fastened together in assembly. Heat treated steel is a suitable material for these members. The assembled members 30U, 30L cooperatively form one or more runner passages 32 for conveying live molding compound material and introducing that material into cavities 24 during a molding cycle of the apparatus. In the particular mold shown here, runner 30 has two separate runner passages 32, each of which serves four cavities 24, two cavities side-by-side along each side of a runner passage 32. Each runner passage 32 comprises a main runner portion 34 that is parallel to the length of the runner, and it further comprises four feeder branches 36 at right angles to its main branch portion, each feeder branch serving a respective cavity 24.

Molding apparatus 20 further comprises a manifold 37 that is cooperatively associated with runner 30 by use of two nozzles 38. Manifold 37 comprises an upper manifold member 37U and a lower manifold member 37L suitably fastened to each other in assembly. Manifold 37 runs lengthwise parallel to, and is spaced a distance above, runner 30. Manifold members 37U, 37L cooperatively form an interior manifold space 40 having an entrance 42 located centrally in manifold member 37U and respective exits at respective nozzles 38 that are suitably fastened to manifold member 37L adjacent respective lengthwise ends of manifold 37. The lower tip ends of nozzles 38 are seated in respective bores in upper runner member 30U such that each nozzle can convey molding material from manifold space 40 to a respective runner passage 32.

A cycle of a multiple-cavity injection molding apparatus comprises a sequence of steps, which may be generally described as follows. At the beginning of a cycle, a movable mold member is moved to its closed position against a non-movable mold member thereby closing the cavities. Live molding material is then injected under pressure to fill the cavities. The material injected into the cavities cures to form a molded part in each cavity. The movable mold member is moved to open the cavities, and the molded parts are thereafter removed.

In the particular apparatus 20 described herein, the mold cavities 24 are first closed by moving movable member 28 against non-movable member 26 at parting plane P. Then live molding compound material is injected under pressure through manifold entrance 42, manifold space 40, and nozzles 38 to enter runner passages 32. The injected material is forced through the runner passages and into cavities 24. Thereafter, the material that has been injected into each cavity cures. Finally, the mold is opened to allow the molded part to be removed and a small scrap piece ejected from each cavity. The mold is then re-closed and the cycle is repeated. As will be described in more detail later on, the apparatus further comprises certain mechanisms associated with the creation and removal of the scrap pieces.

In accordance with principles of the invention, the molding compound material that is within runner 30 is kept live during molding cycles so that it does not cure. In this way, live molding material is ready to be injected directly into each cavity from the respective runner passage 32 once the molded parts and scrap pieces created during the previous cycle have been removed from cavities 24 and the mold has re-closed. The molding compound material in the runner is kept live by maintaining the temperature of the immediately surrounding environment sufficient to prevent curing. This is accomplished in the illustrated embodiment by the collective effect of different operations or structures. One operation or structure is the controlled flow of fluid through fluid passages in runner 30. Another is thermally insulating runner 30 from mold members 26, 28.

Lower runner member 30L comprises a fluid passage 46 whose plan shape is shown in FIG. 3. Passage 46 has an entrance 48 at one lengthwise end of lower runner member 30L. From there it makes a lengthwise run along the lower runner member, passing alongside, but in non-intersecting relation to, both the main and the branch passages of passages 32. Before reaching the opposite end of lower runner 30L, passage 46 makes a 90° turn to run a short distance across the lower runner where it makes another 90° turn. From there it makes a return run lengthwise of the lower runner, passing alongside, but in non-intersecting relation to, both the main and the branch passages of passages 32, finally ending at an exit 50 in the same lengthwise end of the lower runner member that contains entrance 48.

Upper runner member 30U comprises a fluid passage 52 whose plan shape is essentially like that of fluid passage 46. Passage 52 has an entrance 54 at one lengthwise end. From there it makes a lengthwise run along the upper runner member, passing alongside, but in non-intersecting relation to, both the main and the branch passages of passages 32. Before reaching the opposite end of upper runner member 30U, passage 54 makes a 90° turn to run a short distance across the runner member where it makes another 90° turn. From there it makes a return run lengthwise of the upper runner member, passing alongside, but in non-intersecting relation to, both the main and the branch passages of passages 32, finally ending at an exit 56 in the same lengthwise end of the lower runner member that contains entrance 54.

Fluids, whose temperatures and flow rates are controlled, enter the respective entrances 48, 54, pass through the respective fluid passages 46, 52, and exit at the respective exits 50, 56. The fluids' temperatures and flow rates are controlled such that the molding compound material in runner passages 32 is maintained live at all times. Because the mold temperature is controlled and the mold members 26, 28 are constructed to provide for cavities 24 to cure the live molding compound material that has been injected into them, the influence of the mold temperature on runner 30 should generally be minimized. This can be accomplished by providing a thermal insulating barrier between runner 30 and mold members 26, 28. In the illustrated runner, both upper runner 30U and lower runner 30L contain recesses in their respective surfaces that confront respective surfaces of mold members 26, 28. In upper runner member 30U, the recesses are in the form of respective grooves 58 that run the entire length of the upper runner member and confront upper mold member 26. In lower runner member 30L, the recesses are in the form of a series of large pockets 60 formed along the sides of the lower runner member. Each of these pockets 60 confronts lower mold member 28 at a respective mold cavity 24. By leaving these recesses 58, 60 empty, they constitute essentially dead air spaces that form thermal insulating barriers. Alternatively, as in FIG. 14, they may be filled with material that can tolerate the temperatures at their locations while possessing poor thermal conductivity.

Runner 30 therefore comprises an upstream portion 30A in runner member 30U and a downstream portion 30B cooperatively defined by runner members 30U, 30L. The runner has entrance openings at surfaces of runner member 30U adapted to be engaged by respective injection nozzles for introducing live thermoset material into the runner such that live thermoset material is constrained to flow through the upstream portion before reaching the downstream portion. The length of upstream portion 30A is transverse to the length of downstream portion 30B. Fluid passage 52 has a length running parallel to the length of the downstream portion 30B, passing proximately adjacent upstream portion 30A. The fluid passage has a transverse dimension parallel to the length of upstream portion 30A, and the length of upstream portion 30A is greater than the transverse dimension of the fluid passage.

It can be seen from FIGS. 3 and 5 that runner 30 is centrally nested in the mold with four cavities 24 to one side and four cavities 24 to the other side. FIG. 5 shows detail of further mechanisms that are associated with the mold. For each mold cavity 24, the "B" side of the mold contains a respective gate cutter pin 62 poised to have a point of action on the injected molding material at a location 64 that is spaced a short distance from the location 66 at which injected material passes from runner 30 into a respective cavity 24. Additionally, the "B" side of the mold contains a respective ejector pin 68 poised to have a point of action on the injected molding material at a location 70 that is spaced between the location 64 of the point of action of the respective gate cutter pin on the injected molding material and the location 66 at which injected material passes from runner 30 into a respective cavity.

After molding material has filled each cavity, the gate cutter pins 62 are operated to the positions shown in FIG. 5. Upon curing of the molding material in each cavity, the location 64 of the point of action of the respective gate cutter pin serves to separate the portion of the cured molding material that forms a molded part 72 in the cavity from a scrap piece 74 has cured between locations 64 and 66. Upon opening of the mold, the ejector pins 68 operate to eject scrap pieces 74. The finished part is removed by any suitable device or mechanism, which may include other ejector pins (not shown).

Figure 7:
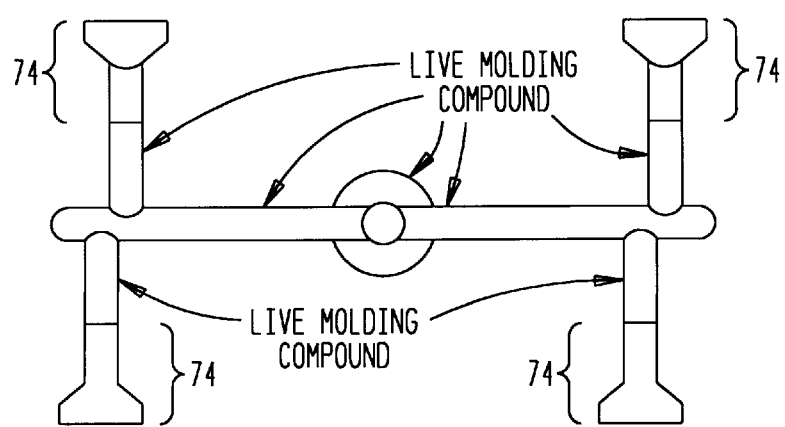
FIG. 7 is a top plan view of molding compound to illustrate how scrap material reduction is achieved by the apparatus illustrated herein.

During a molding cycle, the molding compound material remains live in the runner, with the live material in one of the two runner passages 32 having a shape depicted by FIG. 7. A prior mold having such runners serving multiple cavities was designed to allow the material in the runners to cure along with the parts being molded. That runner material constituted waste scrap because thermoset material, unlike thermoplastic material, cannot be recycled for re-use. Because of the present invention, the only wasted thermoset material is the scrap pieces 74, which is believed to provide a considerable reduction in scrap or waste material from the prior mold and from other known processes. The scrap pieces 74 are shown in FIG. 7 where they extend from the live material.

Details of manifold 37, nozzles 38, and a feeder for feeding live bulk molding compound material into the manifold are known and will not be described in any detail. It is observed however that the manifold includes a fluid passage 78, similar to fluid passages 46, 52, through which fluid flows to keep the temperature of the manifold sufficient to maintain the molding compound material live.

Other parameters of the molding process are selected in accordance with known molding practices. They include variables such as injection pressure, force applied to the closed mold members, curing time, etc. The following description discloses certain relevant parameters and features utilized in the particular apparatus 20 that has been described herein.

The mold (i.e. members 26, 28) is set at 360° F. (a process temperature for curing bulk molding compound material). Manifold 37 is supplied with 80° F. water circulation at a flow rate within a range from about 0.5 gallons per minute to about 1.5 gallons per minute through a $7/16$ inch diameter of passage 78. Each runner fluid passage 46, 52 is supplied with 180° F. water circulation at 1.5 gallons per minute flow rate through a $13/64$ inch diameter of each passage 46, 52. This maintains the bulk molding compound material live at all times up to the point where it enters a cavity at 66. The bottom face of a forward nozzle 80 inserted into manifold entrance 42 seals off against a shoulder in the entrance to prevent leakage of molding material. An interlocking ring formation 82 contains the injection pressure from spreading the two manifold members apart. Nozzles 38 are threaded into tapped holes in the manifold and sealed. The bottom tip ends of the nozzles seal against a surface of the runner so that molding material does not escape. Sufficient cooling of the nozzles is accomplished by the water circulated through the manifold and runner fluid passages. FIG. 5 shows an insulator plate 84 disposed between the manifold and the mold to enhance the thermal insulation of the manifold from the mold.

Figure 8:
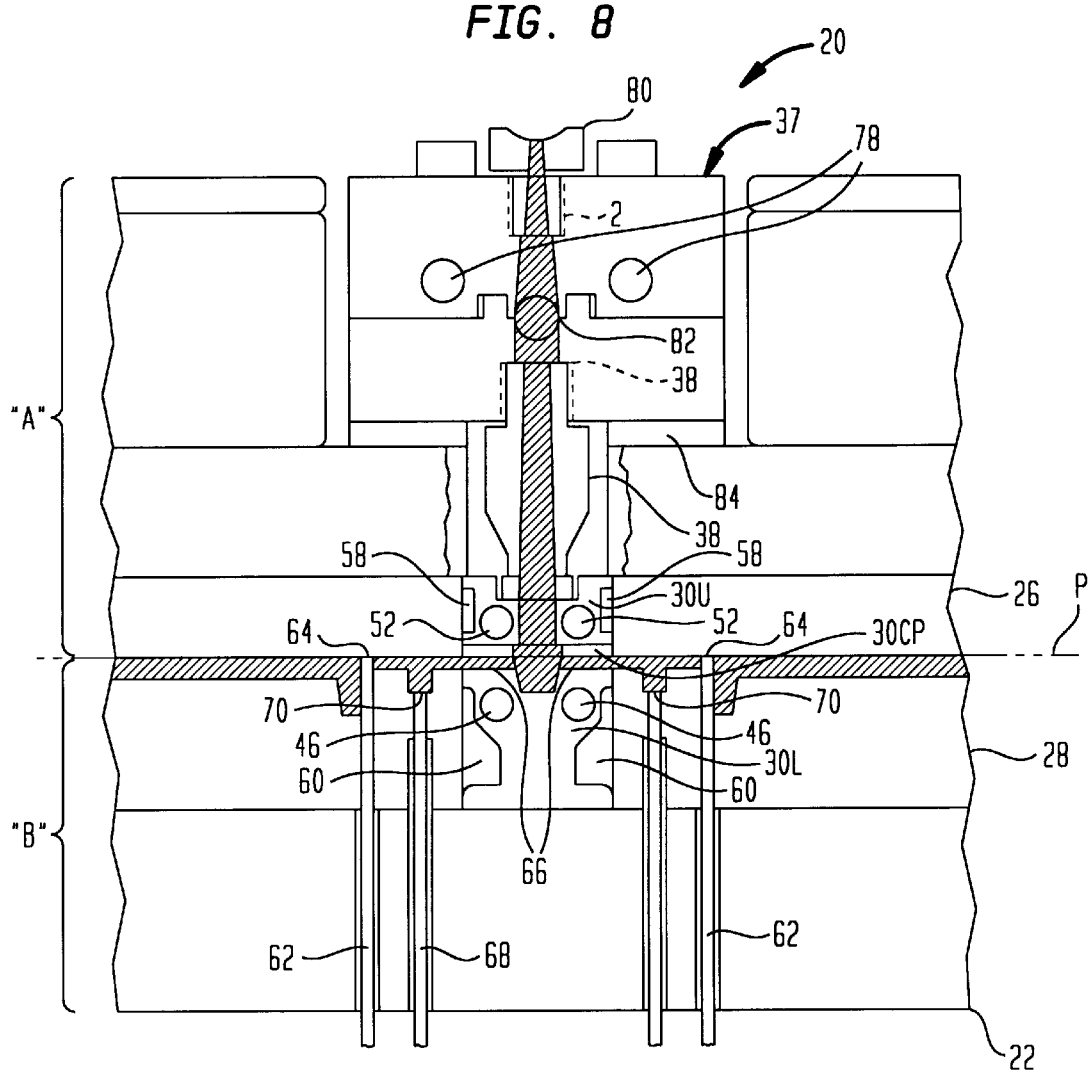
FIG. 8 is a view, similar to FIG. 5, showing a modified embodiment of runner.
Figure 9:
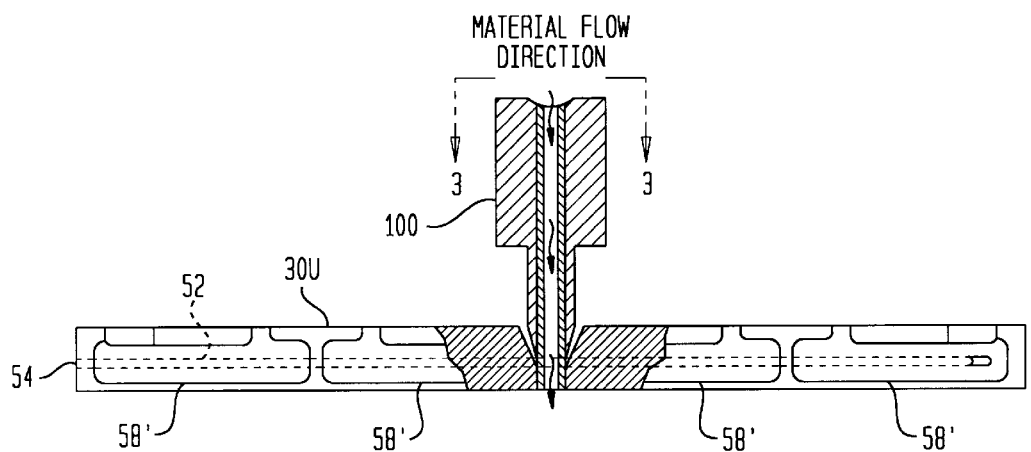
FIGS. 9, 10, 11, and 12 are views corresponding to the views of FIGS. 1, 2, 3, and 4, illustrating another modified embodiment.
Figure 10:
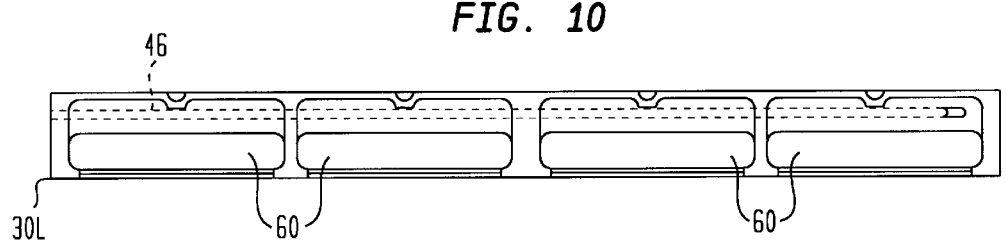
Figure 11:
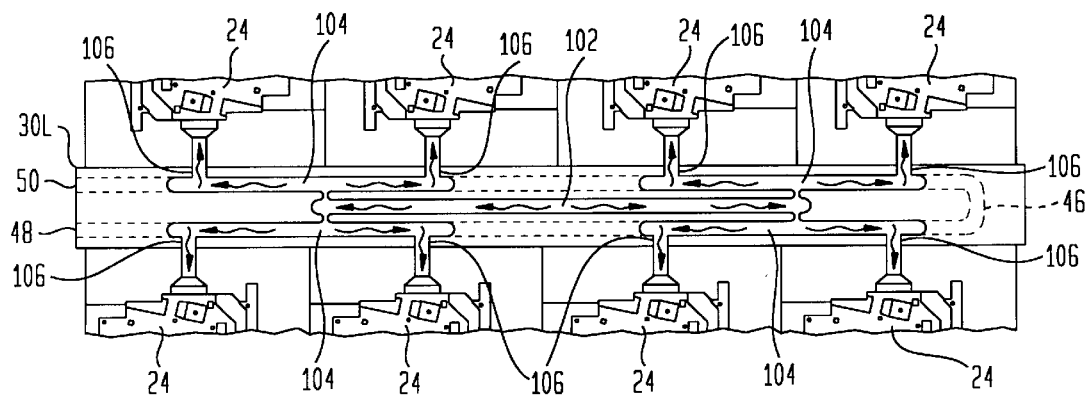

FIG. 8 shows an embodiment of runner 30 that differs from the embodiment already described in that the runner of FIG. 8 contains a cover plate 30CP that is disposed between the upper and lower runner members 30U, 30L. Cover plate 30CP serves to contain the live molding compound material in the vicinity during molding. It does not interfere with passages 32 or fluid passages 46, 52.

FIGS. 9–13 show another embodiment that does not use a manifold for introducing live molding compound material into runner 30. Rather this embodiment uses a single water-cooled nozzle 100 to introduce live molding compound at a central location in upper runner member 30U. Lower runner member 30L comprises a runner passage layout having a straight main runner portion 102 at the middle of whose length molding compound material from nozzle 100 is introduced. Proximate each lengthwise end of main runner portion 102, it communicates with the midpoint of each of a pair of straight runner passages 104 that are disposed to either side. The length of each runner passage 104 spans a respective pair of mold cavities 24. There are two branch passages 106 extending transversely from a location proximate a respective lengthwise end of each passage 104 to an entrance of a respective cavity 24. The upper and lower runner members 30U, 30L have coolant passages 52, 46 like those of the earlier embodiment.

Figure 12:
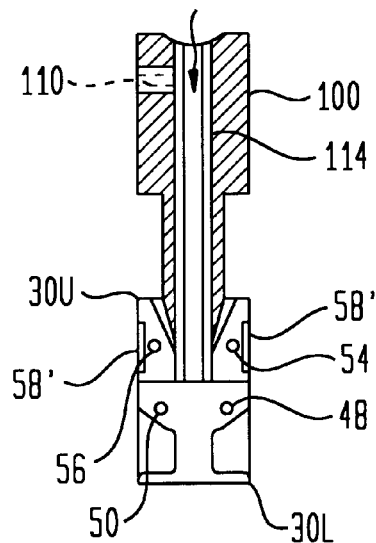
Figure 13:
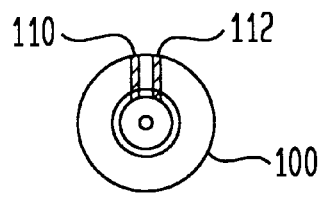
FIG. 13 is a view in the direction of arrows 13—13 in FIG. 9.

FIGS. 12 and 13 show that nozzle 100 comprises a live sprue bushing having an inlet 110 and an outlet 112 that are in communication with interior passages of a cylindrical jacket 114 surrounding a portion of the length of the nozzle. Water enters inlet 110, passes downward through a spiral passage of the jacket, and returns upward through a spiral passage to exit at outlet 112. Like the earlier embodiment, the embodiment of FIGS. 9–13 keeps the molding compound material live throughout the runner. This runner of FIGS. 9–12 is sometimes referred to in the trade as a balanced runner, but it is understood that the invention is also applicable to unblanced runners.

Figure 14:
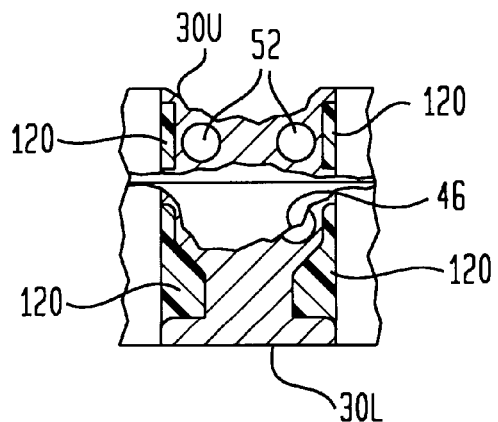
FIG. 14 is a fragmentary view similar to a portion of FIG. 5 showing a modification.

FIG. 14 shows a modification in which thermal insulation material 120 fills grooves 58 and pockets 60 as an alternative to their being empty dead air spaces.

While the present invention has been proven suitable for bulk molding compound as the molding material, it is believed that the invention may be practiced with other thermoset materials. Bulk molding compound material can be obtained from various commercial sources. There may be some differences in the precise composition of bulk molding compound material from different sources, but it is believed that bulk molding compound is understood in the trade to be a generic name for a certain class of thermoset materials.

While the present invention has been described with reference to a preferred embodiment as currently contemplated, it should be understood that the invention is not intended to be limited to that embodiment. Accordingly, the invention is intended to encompass various modifications and arrangements that are within the scope of the claims.

What is claimed is:

1. Injection molding apparatus comprising:
a mold comprising relatively movable mold members defining multiple cavities in which parts are molded;
the mold further comprising a runner which is proximately adjacent the mold members and through which live thermoset material is introduced into the cavities;
the runner and the mold having a cooperative association such that while thermoset material that has been introduced into a respective cavity cures into a respective part and the respective cured part is removed from the respective cavity, thermoset material that remains in the runner is kept live for introduction into the cavities during a following molding cycle;
the runner comprising plural runner members fastened together in assembly to cooperatively define a runner passage through which live thermoset material is conveyed to the cavities, the runner passage comprising an upstream portion in one of the runner members and a downstream portion defined at least in part by another of the runner members, the runner having an entrance opening at a surface of the one runner member adapted to be engaged by an injection nozzle for introducing live thermoset material into the runner passage; and
wherein the upstream and downstream portions of the runner passage have respective lengths, the length of the upstream portion of the runner passage in the one runner member is transverse to the length of the downstream portion of the runner passage, the one runner member comprises a fluid passage through which fluid passes to contribute to maintaining thermoset material live in the runner passage, the fluid passage has a length running parallel to the length of the downstream portion of the runner passage passing proximately adjacent the upstream portion of the runner passage in the one runner member, the fluid passage has a transverse dimension parallel to the length of the upstream portion of the runner passage in the one runner member, and the length of the upstream portion of the runner passage in the one runner member is greater than the transverse dimension of the fluid passage.

2. Injection molding apparatus as set forth in claim 1 wherein a thermal insulation barrier is disposed between the mold and the runner to contribute to maintaining thermoset material live in the runner.

3. Injection molding apparatus as set forth in claim 2 wherein the thermal insulation barrier comprises dead air space.

4. Injection molding apparatus as set forth in claim 2 wherein the thermal insulation barrier comprises insulating material.

5. Injection molding apparatus as set forth in claim 1 wherein the runner is straight and nested within the mold between mold cavities on opposite sides of the runner.

6. Injection molding apparatus as set forth in claim 5 wherein a thermal insulation barrier is disposed between the mold and the sides of the runner to contribute to maintaining thermoset material live in the runner.

7. Injection molding apparatus as set forth in claim 6 wherein the sides of the runner comprise dead air space forming the thermal insulation barrier.

8. Injection molding apparatus as set forth in claim 6 wherein the thermal insulation barrier comprises insulating material.

9. Injection molding apparatus as set forth in claim 1 including a thermal insulation barrier between the one runner member and one of the mold members, and a thermal insulation barrier between the another runner member and another of the mold members.

10. Injection molding means comprising:
mold means comprising relatively movable mold members defining multiple mold cavities in which parts are molded;
the mold means further comprising runner means which is proximately adjacent the mold members for running live thermoset material into the cavities;
the runner means and the mold means having a cooperative association such that while thermoset material that has been introduced into a respective cavity cures into a respective part and the respective cured part is removed from the respective cavity, thermoset material that remains in the runner means is kept live for introduction into the cavities during a following molding cycle;
the runner means comprising plural runner members fastened together in assembly to cooperatively define runner passage means through which live thermoset material is conveyed to the cavities, the runner passage means comprising an upstream portion in one of the runner members and a downstream portion in another of the runner members, the runner means having entrance opening means at a surface means of the one runner member adapted to be engaged by an injection nozzle means for introducing live thermoset material into the runner passage means; and
wherein the upstream and downstream portions of the runner passage means have respective lengths, the length of the upstream portion of the runner passage means in the one runner member is transverse to the length of the downstream portion of the runner passage means, the one runner member comprises fluid passage means through which fluid passes to contribute to maintaining thermoset material live in the runner passage means, the fluid passage means has a length running parallel to the length of the downstream portion of the runner passage means passing proximately adjacent the upstream portion of the runner passage means in the one runner member, the fluid passage means has a transverse dimension parallel to the length of the upstream portion of the runner means in the one runner member, and the length of the upstream portion of the runner means in the one runner member is greater than the transverse dimension of the fluid passage means.

11. Injection molding means as set forth in claim 10 including a thermal insulation barrier means between the one runner member and one of the mold members, and a thermal insulation barrier means between the another runner member and another of the mold members.

* * * * *